May 30, 1944.  J. P. CHRISTENSEN  2,350,215
CALF FEEDER
Filed Sept. 30, 1942
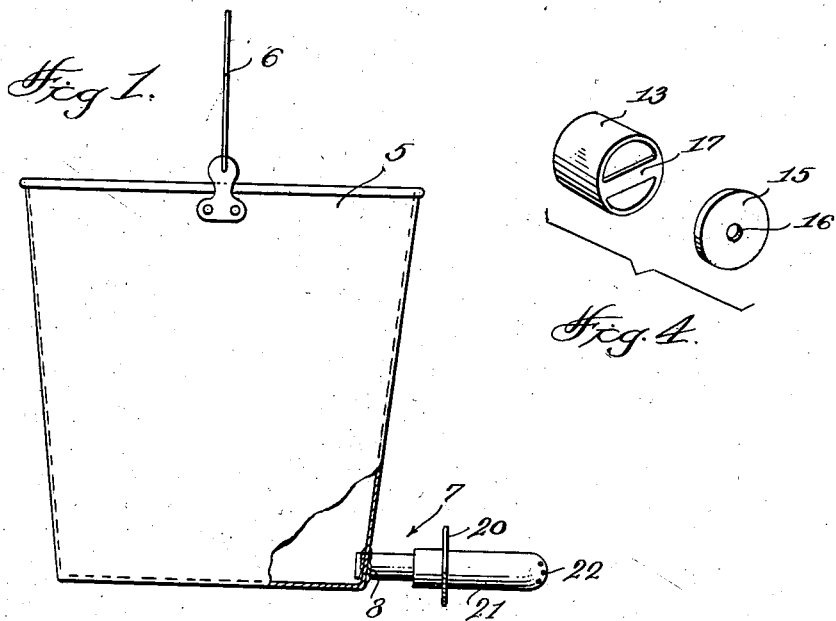
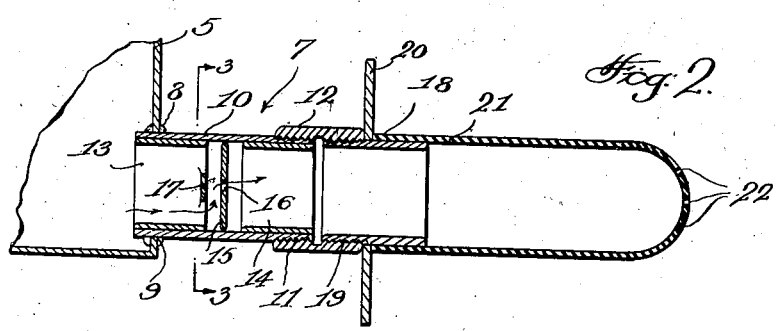
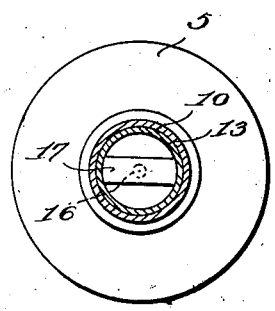
Jens P. Christensen
INVENTOR
BY Victor J. Evans & Co.
ATTORNEYS Patented May 30, 1944

2,350,215

UNITED STATES PATENT OFFICE 2,350,215

CALF FEEDER

Jens P. Christensen, Darrington, Wash.

Application September 30, 1942, Serial No. 460,246

3 Claims. (Cl. 119—71)

The present invention relates to improvements in feeding devices for calves and other nursing animals.

The primary object of the invention is to provide a feeding device of the above character which embodies valve means for preventing the liquid being fed to the animals from being forced back into the receptacle from which the animal is fed.

Another object of the invention is to provide an improved feeding device for calves and other nursing animals that is simple in construction, relatively inexpensive to manufacture and exceedingly durable in use.

The invention also consists in certain other features of construction and in the combination and arrangement of the several parts, to be hereinafter fully described, illustrated in the accompanying drawing and specifically pointed out in the appended claims.

In describing my invention in detail, reference will be had to the accompanying drawing wherein like characters denote like or corresponding parts throughout the several views, and in which:

Figure 1 is a side elevational view, partly in section, illustrating the improved feeding device attached to a receptacle.

Figure 2 is a detail sectional view thereof.

Figure 3 is a vertical sectional view taken substantially on line 3—3 of Figure 2.

Figure 4 is an exploded perspective view of the valve mechanism forming a part of the device.

Referring to the drawing for a more detailed description thereof, a receptacle adapted to contain a quantity of liquid food for calves or other nursing animals is designated by the reference numeral 5, the same being provided with a bail 6 of conventional construction. The feeding device in accordance with the present invention is generally designated by the reference numeral 7, the same to be soldered or otherwise secured as indicated at 8 adjacent the bottom of the receptacle 5. As clearly shown in Figure 2 of the drawing, the device 7 fits within an opening 9 formed in the receptacle 5 adjacent the bottom thereof whereby the contents of the receptacle will be discharged through the feeding device to be hereinafter more specifically described.

The feeding device 7 comprises a section of tubing 10, one end of which is disposed through the opening 9 and secured to the receptacle by solder or the like as previously described. The other end of the tubing 10 as provided with exteriorly formed threads 11 for the reception of a coupling member 12, the purpose of which will be hereinafter described. A pair of relatively smaller and shorter tubes 13 and 14, respectively, are forced into the tubing 10, the inner ends of the tubes 13 and 14 being spaced apart as shown in Figure 2. The other ends of the tubes 13 and 14 terminate adjacent the inner and outer ends respectively, of the tubing 10. As is to be understood, the tubes 13 and 14 have a force fit within the tubing 10 and are, therefore, frictionally held therein.

A washer 15 having a central aperture 16 is slidably mounted in the space between the tubes 13 and 14, said washer acting as a check valve to prevent the liquid passing back into the receptacle 5. A bar 17 extends transversely of the tube 13 against which the washer 15 abuts for closing the aperture 16 for preventing the liquid passing back into the receptacle 5. In the position of the washer shown in Figure 2 of the drawing, liquid from the receptacle passes outwardly through the tube 13 and aperture 16 following the direction of the arrows.

A second section of the tubing 18 is united with the tubing 10 by means of the coupling 12, the tubing 18 being provided with exteriorly formed threads 19 for engagement by the coupling. A disc shaped leather guard 20 surrounds the tubing 18 and abuts against the coupling 12 and a nipple 21 molded of latex to a teat like form, is supported on the outer end of the tubing 18. The coupling 12 unites the tubing 10 and 18 while the inner end of the nipple is forced against the guard 20 to hold the same pressed against the outer end of the coupling. At its outer end the nipple 21 is provided with a plurality of apertures 22 through which the liquid flows when the animal is feeding.

The manner of using the device is thought to be obvious from the description and drawing. The animal in the act of feeding, nurses on the teat like nipple 21 and the outward flow of the liquid will maintain the washer 15 out of engagement with the bar 17. However, backward flow of the liquid will force the washer against the bar to thereby close the aperture 16 preventing the liquid being fed back into the receptacle 5. The leather guard 20 prevents the animal's mouth from contacting any portion of the feeding device other than the nipple 21.

Also it will be understood, of course, by those skilled in the art that variations in the hereinabove described device involving the substitution of substantial equivalents for the devices described are intended to be comprehended within the spirit of the present invention and that the invention is capable of extended application and is not confined to the exact showing of the drawing nor to the precise construction described and, therefore, such changes and modifications may be made therein as do not affect the spirit of the invention nor exceed the scope thereof as expressed in the appended claims.

What is claimed is:

1. A feeding device of the character described, comprising a tubular member adapted to be attached to a receptacle for the passage of liquid therethrough, a pair of tubes held in spaced relation within said member, a nipple secured to the free end of said member, a check valve slidably held within said member between the ends of said tubes, and means carried by one of said tubes adapted to be engaged by said check valve for controlling the flow of liquid through said member.

2. In a feeding device, a feed conducting tube, a pair of tubular members fixed within the feed tube and having their inner ends spaced axially therein, a bar extending diametrically of the inner end of one of said tubular members, a transversely disposed disk slidably mounted in the feed tube between the inner ends of said tubular members, said disk having a center aperture co-operative with said bar to provide a check valve, and a nipple connected with the feed tube.

3. In a feeding device, a feed tube, a pair of relatively short tubular members fixed within said feed tube and having their inner ends spaced axially therein, a bar extending diametrically of the inner end of one of said tubular members, a transversely disposed disk slidably mounted in the feed tube between the inner ends of said tubular members and limited in its axial movement thereby, said disk having a center aperture co-operative with the bar to provide a check valve, and a nipple making connection with one end of the feed tube.

JENS P. CHRISTENSEN.